United States Patent [19]

McLuckie

[11] 3,955,479

[45] May 11, 1976

[54] FLUID PRESSURE OPERATED ACTUATOR WITH SAFE DISASSEMBLY MEANS

[75] Inventor: Walter L. McLuckie, Coal City, Ill.

[73] Assignee: Caterpillar Tractor Co., Peoria, Ill.

[22] Filed: June 10, 1974

[21] Appl. No.: 477,759

[52] U.S. Cl. .............................. 92/128; 92/130 R; 92/168; 92/171; 92/255
[51] Int. Cl.² ............... F01B 31/00; F01B 29/08; F16J 11/04; F16J 15/18
[58] Field of Search .............. 92/128, 130 R, 131, 92/171

[56] References Cited
UNITED STATES PATENTS

| | | | |
|---|---|---|---|
| 2,268,733 | 1/1942 | Williams | 92/130 |
| 2,770,037 | 11/1956 | Bjorklund et al. | 92/130 |
| 2,966,143 | 12/1960 | Panza | 92/130 |
| 3,168,854 | 2/1965 | Neilson | 92/131 |
| 3,182,564 | 5/1965 | Sobeck et al. | 91/421 |
| 3,227,053 | 1/1966 | Spalding | 92/171 |
| 3,272,088 | 9/1966 | Kistler | 92/171 |
| 3,288,166 | 11/1966 | Wagner | 137/509 |
| 3,294,030 | 12/1966 | Fox | 92/128 |
| 3,499,510 | 3/1910 | Taylor et al. | 92/128 |
| 3,746,134 | 7/1973 | Viner | 188/203 |

*Primary Examiner*—Paul E. Maslousky
*Attorney, Agent, or Firm*—Phillips, Moore, Weissenberger Lempio & Strabala

[57] ABSTRACT

A fluid pressure operated actuator has a cylinder with a removable end cap and a piston rod extending axially through the end cap for transmitting piston movement to an external load and also has an internal compressed spring biasing the piston rod towards a predetermined position. To prevent violent expulsion of elements by the compressed spring upon removal of the end cap, stop means are provided on the piston rod to limit relaxation of the spring prior to the time that the end cap is fully removed from the cylinder.

2 Claims, 1 Drawing Figure

U.S. Patent  May 11, 1976  3,955,479
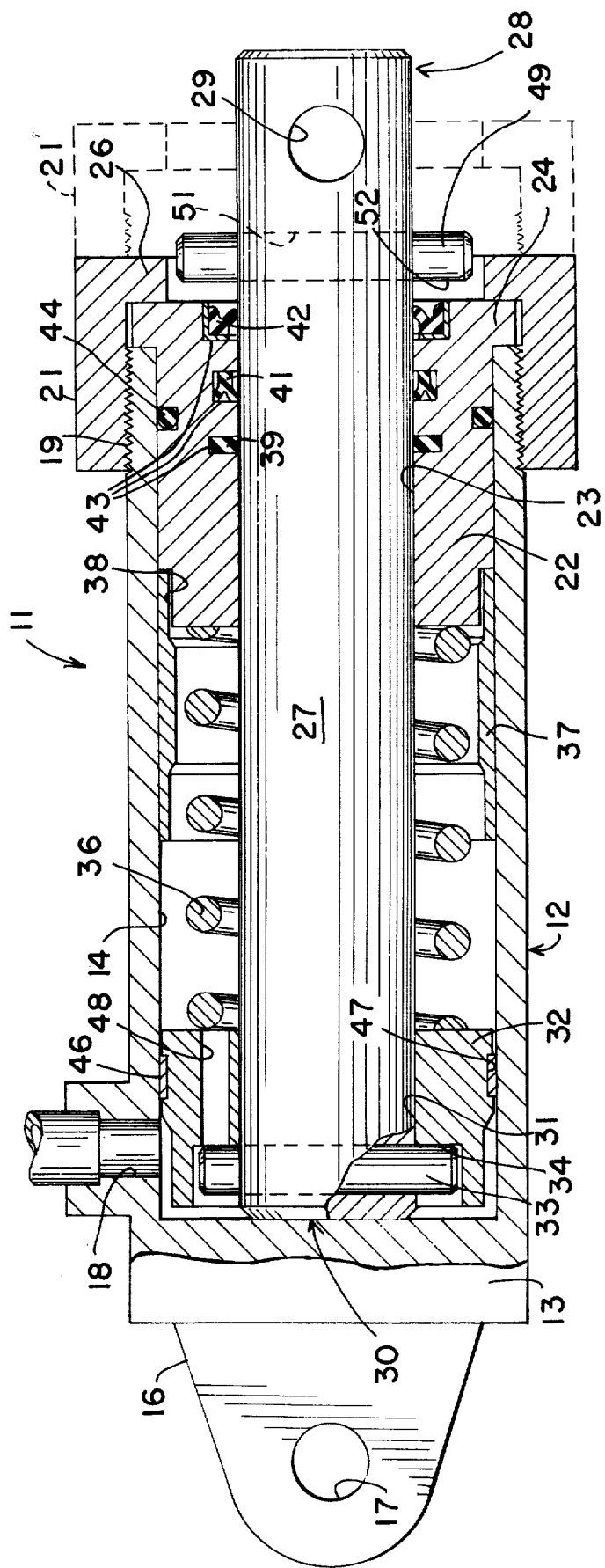

FLUID PRESSURE OPERATED ACTUATOR WITH SAFE DISASSEMBLY MEANS

BACKGROUND OF THE INVENTION

This invention relates to fluid pressure operated actuators of the form having an internal spring means for biasing the actuator towards a predetermined state of contraction or extension. More particularly, the invention is an actuator of this general kind having safety means for preventing sudden release of the spring force upon disassembly of the device.

Fluid pressure operated actuators include a cylindrical housing from which a movable piston rod extends in an axial direction to transmit force to some external load and are further provided with port means for admitting pressurized fluid into the cylindrical housing to force piston rod movement when the device is to be actuated. Such actuators are often one way devices in which fluid pressure acts to move the piston rod in only one direction while an internal spring returns the piston in the opposite direction when the fluid pressure is released.

While the term actuator is herein used to designate devices of the kind discussed above, essentially similar mechanisms are variously known in the art as fluid cylinders, hydraulic jacks, linear fluid motors or by still other names and the term actuator as used herein should be understood to refer to all such devices which have the basic structure discussed above.

In many instances, the spring induced movement of the piston rod is relied upon for exerting a desired force on a load while the opposite movement produced by fluid pressure is simply a means of relieving this force when that is necessary. In these usages of fluid actuators, the necessary spring force may be very large and thus the spring itself is strong and capable of storing a very sizable amount of energy within the actuator. Considering one typical example, pipe laying vehicles have booms for supporting a load through a cable which is wound upon a drum that is controllable by a motor. For safety reasons, the drum is provided with a brake band controlled by a one-way fluid actuator of the form discussed above When the drum is to be turned, the brake is temporarily released by applying pressurized fluid to the actuator. In the absence of such pressurized fluid, an internal spring contracts the actuator to brake the cable drum. In such usage, the spring force present in the unpressurized actuator may be as high as 800 pounds.

In usages such as that described above, the energy stored in the spring within a fluid actuator is of such a magnitude that a very serious hazard has existed when the actuator is to be disassembled for repair, replacement of worn components or for other reasons. Upon disengagement of the end member of the actuator, the spring may expand violently and may propel the end cap and other internal components outwardly with substantial force. This can result in damage to the components and creates a serious risk of injury to nearby personnel.

SUMMARY OF THE INVENTION

This invention provides a spring biased fluid pressure operated actuator which may readily be disassembled without risking injury or damage as the result of sudden release of stored energy by the internal spring means. More specifically, means are provided which block continued relaxation of the spring after a removable end member or the like of the actuator has been only partially disengaged from the cylinder.

In a preferred form of the invention, the removable end member of the actuator must be unthreaded or otherwise shifted outwardly in an axial direction from the cylinder in order to disengage therefrom and a stop element is provided on the piston rod for preventing expansion of the internal compressed spring prior to the time that the end cap fully disengages from the cylinder. Thus, the spring is restrained against further expansion and may be easily removed from the cylinder as a unit with the piston rod.

Accordingly, it is an object of this invention to reduce the risk of personal injury and component damage which can otherwise be present upon disassembly of a spring biased fluid pressure operated actuator. It is another object of the invention to provide a fluid pressure responsive actuator which can be conveniently disassembled and reassembled without elaborate precautions to guard against injury and damage from the release of energy stored in the internal spring means of the actuator.

The invention, together with further objects and advantages thereof, will best be understood by reference to the following description of a preferred embodiment taken in conjunction with the accompanying drawing.

BRIEF DESCRIPTION OF THE DRAWING

The accompanying drawing is a broken out side view of an actuator embodying the invention providing an axial section view of internal structure thereof.

DESCRIPTION OF A PREFERRED EMBODIMENT

Referring now to the drawings, an actuator 11 has a hollow cylindrical housing 12 which, in the present example, has an integral head end closure 13 from which an internal chamber 14 extends to the opposite end of the housing. To couple the head end of the actuator 11 with external mechanism, a mounting tang 16 extends from end closure 13 and is provided with a transverse bore or eye 17 into which a bolt or other coupling means may be entered. To provide for the selective admission of pressurized fluid into the head end of chamber 14, a port opening 18 is present in the wall of cylinder housing 12 near end closure 13.

The rod end of cylinder housing 12 is provided with threads 19 and a removable annular internally threaded end cap 21 may be engaged thereon in coaxial relationship thereto. A fixed annular spring retainer member 22, having an axial passage 23, is disposed within the rod end of cylinder housing 12 in coaxial relationship therewith and has a flange 24 which abuts the rod end of the housing. An inwardly extending lip 26 formed integrally on end cap 21 holds flange 24 against the end of the cylinder 12.

A piston rod 27 extends into cylinder 12, along the axis thereof, through the passage 23 of spring retainer 22 and is of greater length than the cylinder chamber 14 so that one end 28 of the rod always extends from the cylinder. The external end 28 of the piston rod is provided with means, such as a transverse bore 29, enabling connection of the piston rod to a load which is to be shifted by the actuator 11. The brake band of a cable drum of the type previously discussed is one example of such a load but the invention is not limited thereto and is equally advantageous in a variety of other actuator usages known to those skilled in the art.

Within chamber 14, the head end 30 of piston rod 27 extends through an axial passage 31 of a movable annular spring retainer 32. A cross pin 33 is transpierced through the head end 30 of piston rod 27 and extends a short distance outwardly therefrom at each side to abut an annular shoulder 34 formed in retainer passage 31. Pin 33 thereby holds the spring retainer 32 on the head end of piston rod 27.

To establish a force biasing the actuator 11 towards the contracted position, at which end 30 of the piston rod abuts head end closure 13 of the cylinder housing 12, a helical compression spring 36 is disposed coaxially around piston rod 27 between spring retainers 22 and 32. Spring 36 is compressed between the retainers 22 and 32 and thus acts to urge the piston rod 27 towards head end closure 13 of the cylinder 12. The piston rod may be caused to move away from this position, to extend the actuator, by admitting pressurized fluid such as oil or air for example into port 18. The pressurized fluid then acts against the head end 30 of piston rod 27 in opposition to the force of spring 36. The actuator may be returned to the contracted position by releasing the pressurized fluid through the port 18.

To limit the travel of the piston rod during the extension movement, a cylindrical sleeve 37 is disposed within chamber 14 in coaxial relationship to the piston rod 27 and spring 36 and has one end abutting spring retainer 22 within an annular recess 38 formed around the inner end of the spring retainer. Sleeve 37 has a length selected to block further movement of retainer 32 after the piston rod 27 has extended the desired maximum distance.

To inhibit leakage from the actuator, three annular seals 39, 41 and 42 are disposed between spring retainer 22 and piston rod 27 within annular recesses 43 in the inner surface of the retainer and an O-ring 44 is similarly disposed between retainer 22 and the inner surface of cylinder housing 12. To facilitate the sliding movement of the other spring retainer 32, a sleeve bearing 46 may be disposed coaxially on the retainer 32 within an annular groove 47 thereof to ride against the inner surface of cylinder housing 12. A passage 48 extends through the spring retainer 32 to prevent entrapment of leakage fluid within the region of spring 36 as this might otherwise interfere with operation of the actuator if an incompressible fluid is utilized. As the spring retainer 32 in this particular example of the invention does not function as a piston, the presence of pressurized fluid at both ends of the retainer 32 does not affect operation of the actuator. The effective piston area in this example is defined by the head end surface 30 of the piston rod 27 itself.

In the absence of further measures the actuator 11 would be subject to a serious safety problem found in prior art actuators of this general kind which employ a compressed heavy spring such as spring 36. In particular, upon unthreading of end cap 21 from cylinder housing 12 for maintenance or repairs or other reasons, the stored energy in spring 36 might violently eject internal parts such as the spring retainer 22 and indirectly the end cap 21 itself thereby creating a very serious risk of damage and personal injury. Heretofore, extreme caution and elaborate safeguards have been necessary in the course of disassembly of actuators of this general type.

Considering now the means by which this hazard is avoided and by which disassembly of the actuator is greatly facilitated, the present invention provides a stop means, defined by a second cross pin 49 in this example, which blocks expansion of spring 36 and movement of retainer 22 along the piston rod 27 prior to the time that the end cap 21 is fully unthreaded from cylinder housing 12. Cross pin 49 extends transversely through piston rod 27 within a transverse bore 51 in the piston rod and has ends which extend a short distance outwardly from each side of the piston rod. As the end cap 21 is in the process of being unthreaded from cylinder housing 12 and is moving outward thereon in an axial direction, spring retainer 22 is driven by spring 36 into abutment with the projecting ends of the cross pin 49 prior to the time that the end cap has reached the position 21' at which it is fully disengaged from the cylinder housing. Thus, the surface 52 of the cross pin 49 which faces spring retainer 22 should be spaced from the retainer 22 a distance not greater than the length of the engaged threads 19 when the actuator is assembled and is in the fully contracted position depicted in the drawing. Preferably there is some small spacing between the cross pin 49 and the end of spring retainer 22 when the mechanism is in the above described contracted position to assure that the spring 36 continues to exert the desired biasing force on the piston rod 27 at such times.

Accordingly, upon disassembly, spring 36 may at best extend only a small distance and move spring retainer 22 only a correspondingly small distance as the end cap 21 is being unthreaded from cylinder 12 but such movement is stopped prior to the time that the end cap is fully released from the cylinder. Upon contact of the spring retainer 22 with cross pin 49, further spring expansion and further movement of retainer 22 is blocked and the unthreading of the end cap 21 may then be continued without hazard. Upon complete removal of the end cap, piston rod 27, spring retainers 22 and 32 and spring 36 may then be safely withdrawn from cylinder 12 as a unit and without special precautions.

While the invention has been described with respect to a single exemplary embodiment, it will be apparent that many modifications are possible and it is not intended to limit the invention except as defined in the following claims.

What is claimed is:
1. A fluid pressure operated actuator comprising:
   a cylindrical housing having at least one open end;
   a disengageable end closure fastened to said open end of said cylinder;
   a piston rod extending into said cylindrical housing for axial movement relative thereto between a contracted position and an extended position;
   spring means within said cylindrical housing for urging said piston rod towards a predetermined one of said positions; wherein said spring means includes at least one compression spring disposed coaxially around a portion of said piston rod within said cylindrical housing;
   means for admitting pressurized fluid into said cylindrical housing for forcing said piston rod towards the other of said positions against the force of said spring means;
   a first annular spring retainer disposed coaxially within said open end of said cylindrical housing and having said spring abutted thereagainst, and a second annular spring retainer disposed coaxially within said cylindrical housing and being abutted against the other end of said spring and being slidable within said housing with said piston rod; and stop means for limiting relaxation of said spring means as said end closure is being disengaged from said cylindrical housing, wherein said stop means includes an element carried on said piston rod in position to be abutted by said first spring retainer as said first spring retainer is urged out said open end of said housing by said spring as said end closure is in the process of being removed from said housing, said stop means being a cross pin extending transversely through said piston rod and having ends extending radially therefrom to block movement of said first spring retainer along said piston rod after said end closure has been partially disengaged from said cylinder.

2. A fluid pressure operated actuator comprising:

a hollow cylinder having an open rod end and a closed head end and having a fluid port in proximity to said head end, an annular first spring retainer disposed coaxially within said rod end of said cylinder, a piston rod extending axially into said cylinder through said first spring retainer, a second annular spring retainer disposed within said cylinder in coaxial relationship to said piston rod and being slidable within said cylinder with said piston rod, a helical compression spring, disposed in said cylinder in coaxial relationship with said piston rod and being compressed between said first and second spring retainers to exert a force urging said piston rod towards said head end of said cylinder, a removable annular end cap encircling said piston rod at said open end of said cylinder and being threadably engaged upon said open end of said cylinder and being removable therefrom by rotation accompanied by axial movement relative to said cylinder, said end cap having means abutting said first spring retainer for holding said first spring retainer within said open end of said cylinder while said end cap is engaged thereon and for causing said first spring retainer to exert compressive force on said spring as said end cap is threaded onto said cylinder, and means forming a radially extending surface on said piston rod which is positioned to be abutted by said first spring retainer only after said end cap has been partially unthreaded from said cylinder to stop expansion of said spring prior to complete disengagement of said end cap from said cylinder.

* * * * *